3,396,151
POLYAMIDES FROM METHYLENE DIBENZOIC ACID CHARACTERIZED BY RELATIVELY HIGH SOFTENING AND MELTING POINTS
John R. Caldwell, Kingsport, Tenn., assignor to Eastman Kodak Company, Rochester, N.Y., a corporation of New Jersey
No Drawing. Filed Jan. 31, 1962, Ser. No. 170,240
3 Claims. (Cl. 260—78)

This invention relates to a new and efficient process for the preparation of methylenedibenzoic acids, and esters and salts thereof, represented by the following general formula:

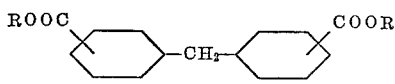

wherein R represents an atom of hydrogen, an alkyl group of from 1–4 carbon atoms, an alkali metal atom such as lithium, sodium, potassium, etc., or the ammonium group —$NH_4$, and more particularly to 4,4'-methylenedibenzoic acid and esters and salts thereof as defined above. These compounds are all valuable chemical intermediates and enter into various condensation reactions requiring bifunctional groups, for example, for the production of polyesters and polyamides.

The preparation of methylenedibenzoic acids from benzophenonedicarboxylic acids by means of chemical reducing agents such as tin-hydrochloric acid and zinc-acetic acid is known. However, these methods are not commercially feasible because of cost. Furthermore, the reductions are not quantitative and selective. The products are contaminated with unchanged keto-acid and with hydroxy-acid byproduct. Both of these latter materials are very difficult to separate from the desired product. Also the keto-acid and the hydroxy-acid function as cross-linking agents in polymer formation even when present in minute quantities. We have now found that the keto-group contained in benzophenone dicarboxylic acids can be selectively and quantitatively converted to a methylene group by catalytic hydrogenation under specific conditions and with certain catalysts. This is a surprising discovery because it is known that these same catalysts are effective in hydrogenating aromatic acids to produce cyclohexane derivatives. It would be expected, therefore, that the hydrogenation of benzophenone acids would result in the formation of methylenedicyclohexane dicarboxylic acids.

It is, acocrdingly, an object of the invention to provide a new and efficient method for the preparation of methylenedibenzoic acids from benzophenonedicarboxylic acids. Another object is to convert benzophenonedicarboxylic acids by a new and efficient catalytic hydrogenation method to methylenedibenzoic acids. Another object is to provide 4,4'-methylenedibenzoic acid by the new method of the invention. Other objects will become apparent hereinafter.

In accordance with the invention, we prepare methylenedibenzoic acids, esters and salts (diphenylmethane derivatives) under catalytic hydrogenation conditions that selectively convert the ketone group of the starting intermediate to a methylene group, as shown in the following reaction equation:

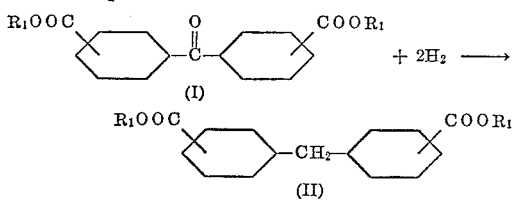

wherein $R_1$ represents a like member selected from the group consisting of an alkyl group of from 1–4 carbon atoms, an alkali metal atom and ammonium group. The reaction is advantageously carried out in an inert liquid solvent medium wherein both the intermediate compound and product are soluble. When the alkali metal or ammonium salt of the intermediate benzophenonedicarboxylic acid is used, the reduction is advantageously carried out in aqueous solution. When an ester of the intermediate benzophenonedicarboxylic is used, the reduction is preferably carried out in an organic solvent such as a lower alkanol represented by methanol, ethanol, isopropanol, tert. butanol, etc., or a lower alkyl ester such as methyl acetate, ethyl acetate, propyl acetate, etc., or an ether such as diethyl ether, 1,4-dioxane, etc., and the like solvents. The product (II) in the above equation can be separated, if desired, from the reaction solution by conventional means such as evaporation, distillation, extraction, etc.

To obtain the free acid, the aqueous reaction mixture in the case of the salt product is simply acidified preferably with a strong mineral acid such as hydrochloric acid, sufuric acid, phosphoric acid, etc., whereby the free acid product precipitates out of solution and may be filtered out and washed with water and dried. The ester product can also be converted to the free acid product by conventional means as by saponification, followed by acidification and separation of the precipitated free acid product.

An important aspect of the invention is accurate temperature control during the hydrogenation reaction. If the temperature is too high, reduction of the aromatic rings will occur. If the temperature is too low, the ketone group is reduced to a hydroxyl group. Suitable temperatures for carrying out the process of the invention can vary from 95–130° C. When Raney nickel is used as catalyst, the optimum temperature is 120–130° C. and preferably 123–128° C. When palladium catalyst is used, the preferred temperature is 98–125° C. Platinum catalyst is used under substantially the same conditions as palladium. Hydrogenation is usually complete in a period of 2–6 hours.

The reduction may be carried out on pure, individual isomers or it may be carried out on mixtures of two or more isomers in any proportions. The resulting methylenedibenzoic acids are separated and/or purified by known methods. The reductions are carried out under hydrogen pressures maintained in the range of from 1000–3000 p.s.i.

The following examples will serve to illustrate further the manner whereby we practice the process of the invention.

EXAMPLE 1

A mixture of 186 g. of 4,4'-benzophenonedicarboxylic acid and 55 g. of sodium hydroxide were dissolved in 425 cc. of water. The solution was filtered and placed in an autoclave. Fifteen g. of Raney nickel was added and a hydrogen pressure of 1000 p.s.i. was introduced. The temperature was raised to 125° C. and the autoclave was agitated for 5 hours. The hydrogen pressure was maintained at 1500 p.s.i. by occasional repressuring.

The 4,4'-methylenedibenzoic acid which formed was isolated by acidifying the solution and filtering out the precipitated acid. The yield was essentially quantitative. Analysis of the crude product gave 65.8% carbon; 4.63% hydrogen (calc. 66.2%: 4.42%, respectively).

EXAMPLE 2

A mixture of approximately 50% of 4,4'-benzophenonedicarboxylic acid and 50% of 2,4'-benzophenonedicarboxylic acid was converted to the sodium salt and reduced as described in Example 1. The product was precipitated by adding sulfuric acid to the solution. The precipitate was washed with water and dried. The product was then boiled with acetone and filtered. The material insoluble in acetone was essentially pure 4,4'-methylenedibenzoic acid. The acetone solution was evaporated to give a residue of essentially pure 2,4'-methylenedibenzoic acid.

EXAMPLE 3

The sodium salt of 4,4'-benzophenonedicarboxylic acid was dissolved in water to give a 30-35% solution. Palladium on alumina was added as catalyst and hydrogenation was carried out at 120° C. for 2 hours at 1100 p.s.i. of hydrogen. The product was isolated by adding hydrochloric acid to the solution. The precipitate obtained was 4,4'-methylenedibenzoic acid having a purity of 99% or better.

EXAMPLE 4

100 g. of the dibutyl ester of 4,4'-benzophenenonedicarboxylic acid and 200 g. of ethyl alcohol were placed in an autoclave. Ten g. of palladium on alumina was added and hydrogenation was carried uot with 1200 p.s.i. hydrogen at 115° C. for 3 hours. The yield of dibutyl ester of 4,4'-methylenedibenzoic acid was essentially quantitative.

EXAMPLE 5

The diethyl ester of 4,4'-benzophenonedicarboxylic acid was hydrogenated at 125° C. with Raney nickel catalyst. Dioxane was used as solvent. The yield of diethyl ester of 4,4'-methylenedibenzoic acid was essentially quantitative.

By proceeding in the manner described in the above examples, any other of the compounds coming within the broadest definition of the invention may be prepared, for example, 2,2'-methylenedibenzoic acid, dialkyl esters and alkali metal or ammonium salts thereof from 2,2'-benzophenone carboxylic acid and the mentioned derivatives useful in the invention; 2,3'-methylenedibenzoic acid, dialkyl esters and alkali metal or ammonium salts thereof from 2,3'-benzophenonedicarboxylic acid and the mentioned derivatives useful in the practice of the invention, and the like. These latter products also have the same general utility as chemical intermediates and for condensation polymer applications.

EXAMPLES 6-21

The methylenebenzoic acids of the invention are particularly useful for the preparation of homo and copolyamides which are characterized by relatively high softening them especially useful for fiber making and molding ing them especially useful for fiber making an molding purposes. The polyamides have softening points in the range of from about 210-340° C. The following examples illustrate the preparation and uses of such polyamides.

(6) 16 g. (0.138 mole) of hexamethylenediamine, 32.5 g. (0.127 mole) of 4,4'-methylenedibenzoic acid, 85 cc. of ethyl alcohol and 100 cc. of water were heated to boiling for 20 min. A clear solution was obtained. The solution was cooled slowly and the salt crystallized out. A yield of 43 g. was obtained.

10 g. of this salt was placed in a glass tube, the tube was evacuated and then sealed. It was heated at 230-240° C. for 1.5 hours. The prepolymer was granulated to a particle size of 0.01-0.03 in. and heated in vacuum at 260° C. for 28 hours. The polymer had an inherent viscosity of 1.4 as measured in a 60:40 mixture of phenoltetrachloroethane. It melted at 300-310° C. This polyamide gave good quality fibers on spinning and tough shaped articles on molding.

(7) 7 and 0.5 g. of m-xylene-α,α'-diamine, 12.8 g. of 4,4'-methylenedibenzoic acid, 30 cc. of water and 30 cc. of ethyl alcohol were stirred and heated until a clear solution was obtained. Three hundred and 75 cc. of ethyl alcohol was then added to precipitate the salt.

10 g. of the salt was heated in an evacuated, sealed tube at 240° C. for 1 hour. The prepolymer was then stirred at 280° C. in a nitrogen atmosphere for 2 hours. The polymer softened at 255-270° C. It was useful as a molding plastic.

(8) A salt was prepared from 4,4'-methylenedibenzoic acid and 3,3'-(ethylenedioxy)bispropylamine. The salt was heated in a sealed tube at 240° C. for 1 hour. The prepolymer was then melted and stirred in a nitrogen atmosphere at 270° C. for 1 hour. The polymer softened at 235-250° C. It was useful as a molding plastic.

(9) The acid chloride of 4,4'-methylenedibenzoic acid was reacted with 2-methyl-1,3-diaminopropane in the presence of aqueous sodium carbonate and chloroform to give a polyamide softening at 220-235° C.

(10) A mixture of 70 parts 4,4'-methylenedibenzoic acid and 30 parts 2,4'-methylenedibenzoic acid was heated with an equal molar amount of 1,4-cyclohexanebis(methylamine) in cresol at 210-220° C. for 5 hours. The polymer was precipitated by pouring the cresol solution in methyl alcohol. The polymer softened over the range of 250°-270° C. It was particularly valuable as a molding plastic because it remained transparent after molding.

(11) A polyamide was made from 0.6 mole 4,4'-methylenedibenzoic acid, 0.4 mole sebacic acid, and 1.0 mole 1,4-cyclohexanebis(methylamine). It softened at 255-278° C. and was valuable as a molding plastic because of its high impact strength.

(12) A polyamide was made from 1.0 mole 4,4'-methylenedibenzoic acid, 1.0 mole hexamethylenediamine and 0.30 mole caprolactam. It softened at 260-280° C. and was useful as a molding plastic.

(13) A polyamide was made from 0.5 mole 4,4'-methylenedibenzoic acid, 0.5 mole adipic acid and 1.0 mole α,α'-diamino-p-xylene. It had a softening point above 210° C. It gave strong fibers that were useful as tire cords.

(14) A polyamide was made from 1.0 mole 4,4'-methylenedibenzoic acid and 1.0 mole 1,4-cyclohexanebis(methylamine). It melted at about 350° C.

(15) A polyamide was made from 1.0 mole 4,4'-methylenedibenzoic acid, 0.25 mole hexamethylenediamine and 0.75 mole 1,4-cyclohexanebis(methylamine). It melted at 295-310° C.

(16) A polyamide was made from equimolar quantities of 2,4'-methylenedibenzoic acid and 1,4-cyclohexanebis(methylamine). It softened in the range of 250-275° C. and was useful as a molding plastic.

(17) A polyamide was made from equimolar quantities of 4,4'-methylenedibenzoic acid and α,α'-diamino-p-xylene. It melted at 340° C. and was quite crystalline. Because of its high modulus, the polymer was useful for the manufacture of tire cords.

(18) The acid chloride of 4,4'-methylenedibenzoic acid was reacted with an equimolar quantity of m-phenylenediamine in the presence of aqueous sodium carbonate and chloroform to give a polyamide softening at 280-310° C.

(19) The acid chloride of 4,4'-methylenedibenzoic acid was reacted with an equimolar quantity of 2,4-diaminotoluene in the presence of aqueous sodium carbonate and chloroform to give a polyamide softening at 265-285° C.

(20) Using the method described in Example 18, a polyamide melting at 320-335° C. was prepared from equimolar quantities of 4,4'-methylenedibenzoic acid and 4,4'-methylenebisaniline.

(21) Using the method described in Example 18, a polyamide softening in the range of 260-280° C. was made from equimolar quantities of 2,4'-methylenedibenzoic acid and 4,4'-methylenebisaniline.

While the preparation of the polyamide has been illustrated with just certain diamine compounds, it will be understood any diamines can be used of the general formula:

$$H_2N-R_2-NH_2$$

wherein R is straight or branched chain divalent alkylene group of from 2–12 carbon atoms such as $-C_2H_4-$, $-C_3H_6-$, $-C_{12}H_{24}-$, etc. groups, a divalent aryl group of from 6–15 carbon atoms such as phenylene, tolylene, etc., a divalent alicyclic group such as cyclohexylene, etc. or a diamine containing one or more ether linkages, and the like. Typical diamines that can be used with advantage in addition to those disclosed in the above examples include 2-methyl-1,5-pentanediamine, 2-ethyl-1,6-hexanediamine, 2,2-dimethyl-1,3-propanediamine, 3-ethyl-1,7-heptanediamine, 2,5-diaminoheptane, 1,5-diaminohexane, α,α'-diamino-o-xylene, α,α'-diamino-m-xylene, 1,4-di(2-aminoethyl)benzene, 1,2- and 1,3-cyclohexanebis(methylamine), 1,2-, 1,3- and 1,4-diaminocyclohexane, 2,6 and 2,5-norcamphanebis(methylamine), and diamines represented by structures:

$$H_2N(CH_2)_3-O-(CH_2)_3NH_2$$
$$H_2N(CH_2)_4-O-(CH_2)_4NH_2$$

Other suitable aromatic diamines include -p-phenylenediamine, benzidine, 4,4'-dimethyl-3,5'-diaminodiphenylmethane and 4,4'-sulfonyldianiline. Mixtures of two different diamines can be used.

Copolyamides may be made by using mixtures containing at least 50 mole percent, preferably about from 50 to 90 mole percent, of 4,4'-methylenedibenzoic acid with other dicarboxylic acids. Aromatic dicarboxylic acids may be used, as represented by isophthalic acid, terephthalic acid, diphenic acid, etc. Aliphatic acids may be used as represented by oxalic, dimethylmalonic, carbonic, adipic, pimelic, suberic, azelaic, sebacic, dodecanedioic, etc. Acids containing an alicyclic structure may be used, as presented by cis- and trans-1,4-cyclohexanedicarboxylic acid.

Other types of copolyamides may be made by using 4,4'-methylenedibenzoic acid, a diamine and an amino acid. Suitable amino acids include 6-aminohexanoic acid; 4-aminomethylbenzoic acid; 3-aminomethylbenzoic acid; 4-aminomethylcyclohexanecarboxylic acid.

In a preferred embodiment of the invention, a salt is prepared from 4,4'-methylenedibenzoic acid and a diamine. The salt may be purified by recrystallizing from aqueous alcohol. The salt is then heated in an inert atmosphere, under pressure, at 220–250° C. for 1–2 hours to form a prepolymer. Advantageously, a high-boiling inert solvent is used such as, for example, cresol or o-hydroxydiphenyl. The prepolymer is then granulated to a particle size of 0.01–0.03 inch and heated in a vacuum or inert gas stream at a temperature slightly below the polymer melting point for 1–3 hours. Alternatively, the prepolymer may be melted and stirred in an inert gas stream or in a vacuum.

The above Examples 6–21 all specify the free acid, 4,4'- and 2,4'-methylenedibenzoic acids. However, the various polyamides may also be made by heating the alkyl or phenyl esters of these acids with the mentioned diamines. Polyamides of exceptionally high melting points may be prepared by treating the acid chloride of 4,4'-methylenedibenzoic acid with a diamine in the presence of aqueous alkali.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A resinous polyamide of equimolar proportions of 4,4'-methylenedibenzoic acid and m-xylene-α,α'-diamine, said polyamide having a softening point of from 210–310° C.

2. A resinous copolyamide of from 25 to 45 mole percent of 4,4'-methylenedibenzoic acid, 50 mole percent of 1,4-cyclohexanebis (methylamine) and from 5 to 25 mole percent of 2,4'-methylenedibenzoic acid, the said copolyamide having a softening point of from 210–310° C.

3. A resinous copolyamide of from 25 to 45 mole percent of 4,4'-methylenedibenzoic acid, 50 mole percent of α,α'-diamino-p-xylene and from 5–25 mole percent of adipic acid, the said copolyamide having a softening point of from 210–310° C.

References Cited

UNITED STATES PATENTS

| | | | |
|---|---|---|---|
| 2,904,587 | 9/1959 | Johnson et al. | 260—515 |
| 2,906,774 | 9/1959 | Raecke et al. | 260—515 |
| 2,756,221 | 7/1956 | Caldwell | 260—78 |
| 3,012,994 | 12/1961 | Bell et al. | 260—78 |
| 2,913,433 | 11/1959 | Wittbecker | 260—78 |
| 2,831,834 | 4/1958 | Magat | 260—78 |

WILLIAM H. SHORT, *Primary Examiner.*

H. D. ANDERSON, *Assistant Examiner.*